US009590859B2

(12) United States Patent
Bragstad et al.

(10) Patent No.: US 9,590,859 B2
(45) Date of Patent: *Mar. 7, 2017

(54) DISCOVERING RESOURCES OF A DISTRIBUTED COMPUTING ENVIRONMENT

(71) Applicant: International Business Machines Corporation, Armonk, NY (US)

(72) Inventors: Lance Bragstad, Pine Island, MN (US); Bin Cao, Rochester, MN (US); James E. Carey, Rochester, MN (US); Mathew R. Odden, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/306,355

(22) Filed: Jun. 17, 2014

(65) Prior Publication Data

US 2015/0195143 A1 Jul. 9, 2015

Related U.S. Application Data

(63) Continuation of application No. 14/148,990, filed on Jan. 7, 2014.

(51) Int. Cl.
*H04L 12/24* (2006.01)
*H04L 29/08* (2006.01)

(52) U.S. Cl.
CPC .......... *H04L 41/14* (2013.01); *H04L 41/085* (2013.01); *H04L 67/10* (2013.01)

(58) Field of Classification Search
CPC .......... H04L 41/14; H04L 41/04; H04L 45/74
See application file for complete search history.

(56) References Cited

U.S. PATENT DOCUMENTS 6,249,881 B1   6/2001   Porten et al.
6,353,923 B1   3/2002   Bogle et al.
(Continued)

FOREIGN PATENT DOCUMENTS

EP   2852097 A1   3/2015

OTHER PUBLICATIONS

Fagerstrom et al., "A Paradigm and System for Design and Test of Distributed Applications", Digest of Papers, 33$^{rd}$ IEEE Computer Society International Conference, Compcon Spring '88, Feb. 1998, pp. 189-192, IEEE Xplore Digital Library (online), DOI: 10.1109/CMPCON.1988.4857.

(Continued)

*Primary Examiner* — Nicholas Taylor
*Assistant Examiner* — Afroza Sultana
(74) *Attorney, Agent, or Firm* — Brandon C. Kennedy; Feb Cabrasawan; Kennedy Lenart Spraggins LLP

(57) ABSTRACT

Methods, apparatuses, and computer program products for discovering resources of a distributed computing environment are provided. Embodiments include a management system transmitting an application program interface (API) message to the distributed computing environment. Embodiments also include the management system receiving from the distributed computing environment, a response to the API message and based on the response, identifying a resource of the distributed computing environment.

9 Claims, 7 Drawing Sheets

(56) References Cited

U.S. PATENT DOCUMENTS

| | | | |
|---|---|---|---|
| 8,122,453 | B2 | 2/2012 | Trossman et al. |
| 8,745,641 | B1* | 6/2014 | Coker .................. G06F 11/3668 719/313 |
| 2001/0005852 | A1 | 6/2001 | Bogle et al. |
| 2007/0168968 | A1 | 7/2007 | Bates et al. |
| 2009/0070771 | A1 | 3/2009 | Yuyitung et al. |
| 2009/0119396 | A1 | 5/2009 | Kanda |
| 2009/0300605 | A1 | 12/2009 | Edwards et al. |
| 2010/0107159 | A1 | 4/2010 | Radhakrishnan et al. |
| 2011/0161730 | A1 | 6/2011 | Van Der Merwe et al. |
| 2011/0173327 | A1 | 7/2011 | Chen et al. |
| 2012/0096093 | A1* | 4/2012 | Bouw .................. G06F 9/5061 709/206 |
| 2012/0246202 | A1* | 9/2012 | Surtani ............. G06F 17/30607 707/812 |
| 2012/0272235 | A1 | 10/2012 | Fahrig |
| 2012/0330700 | A1 | 12/2012 | Garg et al. |
| 2013/0132584 | A1* | 5/2013 | Palladino ................ H04L 65/40 709/226 |
| 2014/0007222 | A1 | 1/2014 | Qureshi |
| 2014/0052867 | A1* | 2/2014 | Lucovsky ........... H04L 63/0245 709/226 |
| 2014/0075035 | A1 | 3/2014 | Revanuru et al. |
| 2014/0123292 | A1* | 5/2014 | Schmidt .................. H04L 67/10 726/25 |
| 2014/0282889 | A1* | 9/2014 | Ishaya ..................... H04L 63/08 726/4 |
| 2015/0007199 | A1* | 1/2015 | Valeva .................... G06F 9/546 719/313 |
| 2015/0128131 | A1 | 5/2015 | Cao et al. |
| 2015/0161022 | A1 | 6/2015 | Bragstad et al. |
| 2015/0161023 | A1 | 6/2015 | Bragstad et al. |
| 2015/0195121 | A1 | 7/2015 | Bragstad et al. |

OTHER PUBLICATIONS

Rai et al., "Implementation of DDARC: Software Architecture for Debugging Distributed Programs", ACS/IEEE International Conference on Computer Systems and Applications, Jun. 2001, pp. 220-226, IEEE Xplore Digital Library (online), DOI: 10.1109/AICCSA.2001.933980.

Kurniawan et al., "An Integrated Grid Development Environment in Eclipse", IEEE International Conference on e-Science and Grid Computing, Dec. 2007, pp. 491-498, IEEE Xplore Digital Library (online), DOI: 10.1109/E-SCIENCE.2007.10.

Fagerstrom, "Design and Test of Distributed Applications", Proceedings of the 10th International Conference on Software Engineering, Apr. 1988, pp. 88-92, IEEE Xplore Digital Library (online), DOI: 10.1109/ICSE.1988.93691.

Lee, et al., "Validating Heuristics for Virtual Machines Consolidation", Type: TechReport, Number: MSR-TR-2011-9, Jan. 1, 2011, pp. 1-14, Microsoft Research, Mountain View, CA, USA.

Gong, et al., "PAC: Pattern-driven Application Consolidation for Efficient Cloud Computing", In Proceedings, IEEE/ACM International Symposium on Modeling, Analysis and Simulation of Computer and Telecommunication Systems (MASCOTS), held Aug. 2010, Miami, FL, pp. 24-33, Institute of Electrical and Electronics Engineers (IEEE), Digital Object Identifier: 10.1109/MASCOTS.2010.12.

Kroustek, et al, "Retargetable Multi-Level Debugging in HW/SW Codesign", 2011 International Conference on Microelectronics (ICM), pp. 1-6, 19-22, Dec. 2011, IEEE Computer Society, USA.

Vasudevan, et al., "Stealth Breakpoints", Computer Security Applications Conference, 21st Annual, pp. 1-10, Dec. 2005, IEEE Computer Society, USA.

Olsson, et al., "Sequential Debugging at a High Level of Abstraction", Software, IEEE, vol. 8, No. 3, pp. 27-36, May 1991, IEEE Computer Society, USA.

Spiceworks, "Spiceworks Launches Free Cloud Service Detection Features for Small and Mid-sized Businesses", press release, spiceworks.com (online), May 24, 2012 [accessed Jul. 18, 2013], 2 pages, URL: http://www.spiceworks.com/news/press-release/2012/05-24/.

Di Modica, G., et al., "Resource and Service Discovery in SOAs: A P2P Oriented Semantic Approach", International Journal of Applied Mathematics & Computer Science, Jun. 2011, pp. 285-294, vol. 21, Issue 2, University of Zielona Gora Press, Poland, DOI: 10.2478/v10006-011-0021-2.

Zhou, J., et al., "A Hybird P2P Approach to Service Discovery in the Cloud", International Journal of Information Technology and Computer Science (IJITCS), Feb. 2011, pp. 1-9, vol. 3, No. 1, Modern Education and Computer Science Press (online publication), Hong Kong, mecs-press.org, URL: http://www.mecs-press.org/ijitcs/ijitcs-v3-n1/IJITCS-V3-N1-1.pdf.

* cited by examiner

DISCOVERING RESOURCES OF A DISTRIBUTED COMPUTING ENVIRONMENT

CROSS-REFERENCE TO RELATED APPLICATION

This application is a continuation application of and claims priority from U.S. patent application Ser. No. 14/148,990, filed on Jan. 7, 2014.

BACKGROUND OF THE INVENTION

Field of the Invention

The field of the invention is data processing, or, more specifically, methods, apparatuses, and computer program products for discovering resources of a distributed computing environment.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Modern computing systems can include a plurality of machines that share resources with each other. In a distributed computing environment, there are thousands of resources that can be entrusted in a distributed computing environment and accessed as a service. These resources are of various types and often belong to various environments of different types and reside on the hardware of the environment.

SUMMARY

Methods, apparatuses, and computer program products for discovering resources of a distributed computing environment are provided. Embodiments includes a management system transmitting an application program interface (API) message to the distributed computing environment. Embodiments also include the management system receiving from the distributed computing environment, a response to the API message and based on the response, identifying a resource of the distributed computing environment.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
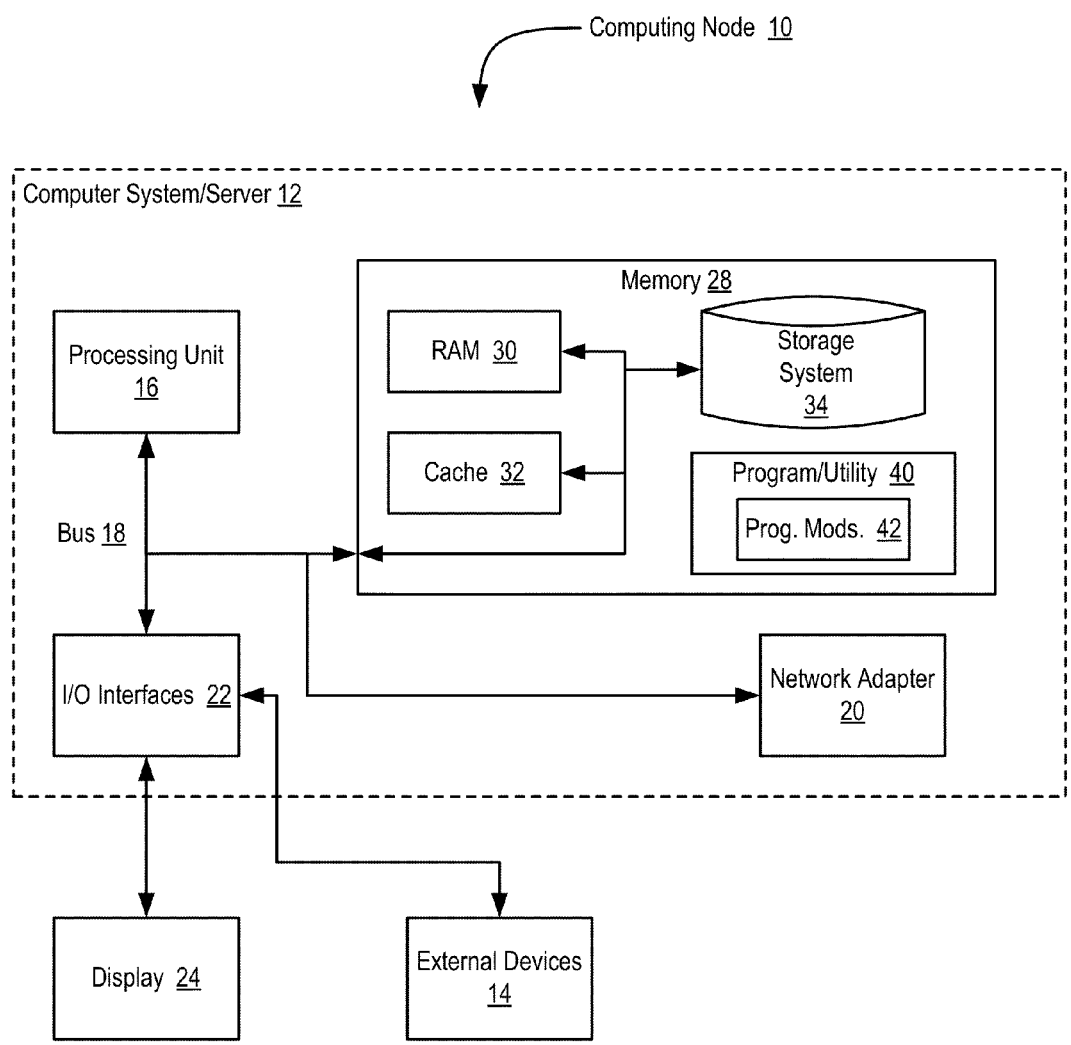
FIG. 1 depicts a cloud computing node according to an embodiment of the present invention.

Example methods, apparatuses, and computer program products for discovering resources in a distributed computing environment in accordance with the present invention are described with reference to the accompanying drawings, beginning with FIG. 1. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service ('SaaS'): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service ('Paas'): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service ('IaaS'): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node (10) is only one example of a suitable cloud computing node and is not intended to suggest any limitation as to the scope of use or functionality of embodiments of the invention described herein. Regardless, cloud computing node (10) is capable of being implemented and/or performing any of the functionality set forth hereinabove.

In cloud computing node (10) there is a computer system/server (12), which is operational with numerous other general purpose or special purpose computing system environments or configurations. Examples of well-known computing systems, environments, and/or configurations that may be suitable for use with computer system/server (12) include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server (12) may be described in the general context of computer system executable instructions, such as program modules, being executed by a computer system. Generally, program modules may include routines, programs, objects, components, logic, data structures, and so on that perform particular tasks or implement particular abstract data types. Computer system/server (12) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server (12) in cloud computing node (10) is shown in the form of a general-purpose computing device. The components of computer system/server (12) may include, but are not limited to, one or more processors or processing units (16), a system memory (28), and a bus (18) that couples various system components including system memory (28) to processor (16).

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA') bus, Micro Channel Architecture (MCA') bus, Enhanced ISA (EISA') bus, Video Electronics Standards Association (VESA') local bus, and Peripheral Component Interconnect ('PCI') bus.

Computer system/server (12) typically includes a variety of computer system readable media. Such media may be any available media that is accessible by computer system/server (12), and it includes both volatile and non-volatile media, removable and non-removable media.

System memory (28) can include computer system readable media in the form of volatile memory, such as random access memory (RAM') (30) and/or cache memory (32). Computer system/server (12) may further include other removable/non-removable, volatile/non-volatile computer system storage media. By way of example only, storage system (34) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (18) by one or more data media interfaces. As will be further depicted and described below, memory (28) may include at least one program product having a set (e.g., at least one) of program modules that are configured to carry out the functions of embodiments of the invention.

Program/utility (40), having a set (at least one) of program modules (42), may be stored in memory (28) by way of example, and not limitation, as well as an operating system, one or more application programs, other program modules, and program data. Each of the operating system, one or more application programs, other program modules, and program data or some combination thereof, may include an implementation of a networking environment. Program modules (42) generally carry out the functions and/or methodologies of embodiments of the invention as described herein.

Computer system/server (12) may also communicate with one or more external devices (14) such as a keyboard, a pointing device, a display (24), etc.; one or more devices that enable a user to interact with computer system/server (12); and/or any devices (e.g., network card, modem, etc.) that enable computer system/server (12) to communicate with one or more other computing devices. Such communication can occur via Input/Output ('I/O') interfaces (22). Still yet, computer system/server (12) can communicate with one or more networks such as a local area network (IAN), a general wide area network ('WAN'), and/or a public network (e.g., the Internet) via network adapter (20). As depicted, network adapter (20) communicates with the other components of computer system/server (12) via bus (18). It should be understood that although not shown, other hardware and/or software components could be used in conjunction with computer system/server (12). Examples, include, but are not limited to: microcode, device drivers, redundant processing units, external disk drive arrays, RAID systems, tape drives, and data archival storage systems, etc.

Figure 2:
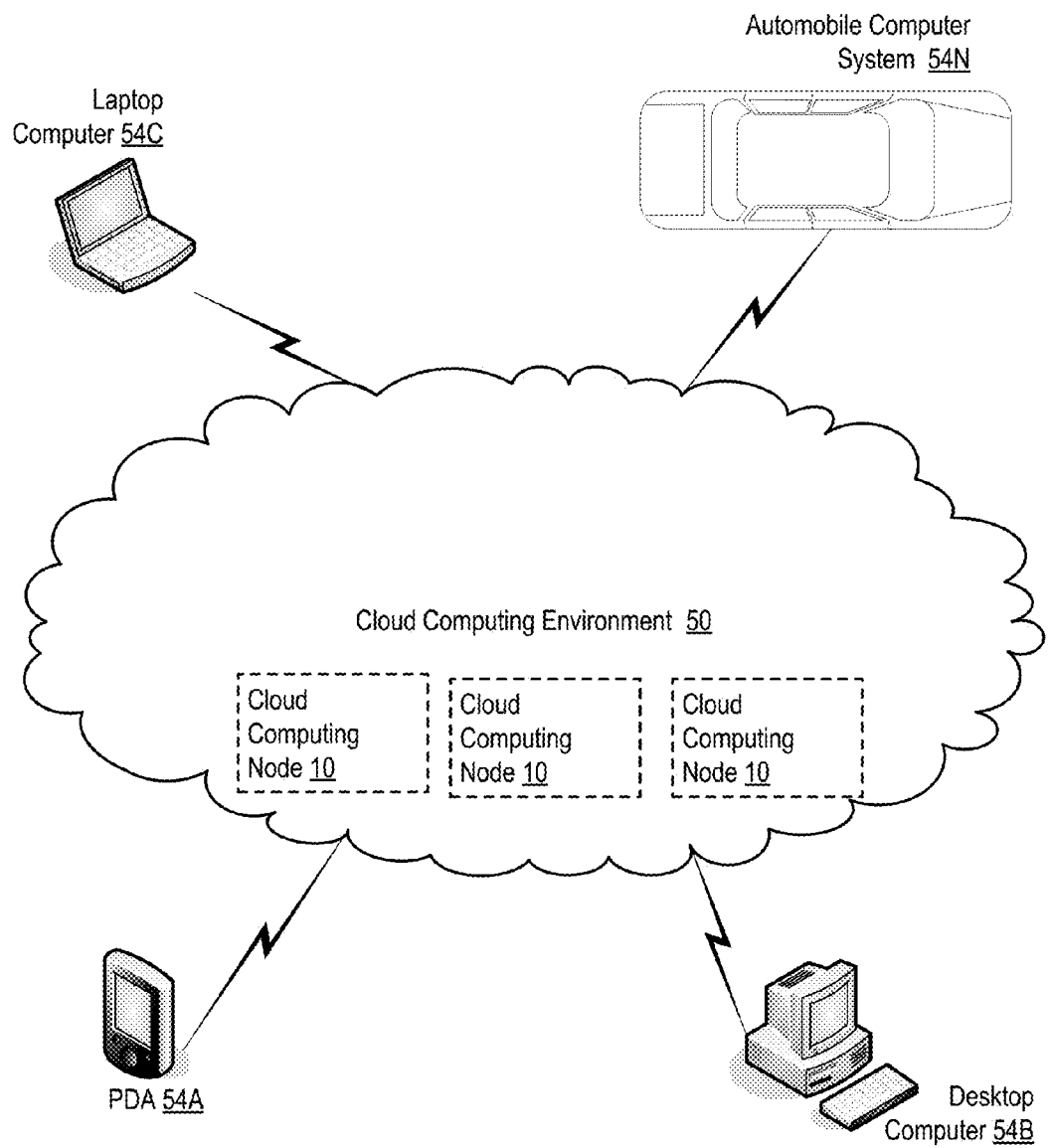
FIG. 2 depicts a cloud computing environment according to an embodiment of the present invention.

Referring now to FIG. 2, illustrative cloud computing environment (50) is depicted. As shown, cloud computing environment (50) comprises one or more cloud computing nodes (10) with which local computing devices used by cloud consumers, such as, for example, personal digital assistant ('PDA') or cellular telephone (54A), desktop computer (54B), laptop computer (54C), and/or automobile computer system (54N) may communicate. The cloud computing nodes (10) may communicate with one another. They may be grouped (not shown) physically or virtually, in one or more networks, such as Private, Community, Public, or Hybrid clouds as described hereinabove, or a combination thereof. This allows cloud computing environment (50) to offer infrastructure, platforms and/or software as services for which a cloud consumer does not need to maintain resources on a local computing device. It is understood that the types of computing devices (54A-N) shown in FIG. 2 are intended to be illustrative only and that computing nodes (10) and cloud computing environment (50) can communicate with any type of computerized device over any type of network and/or network addressable connection (e.g., using a web browser).

Figure 3:
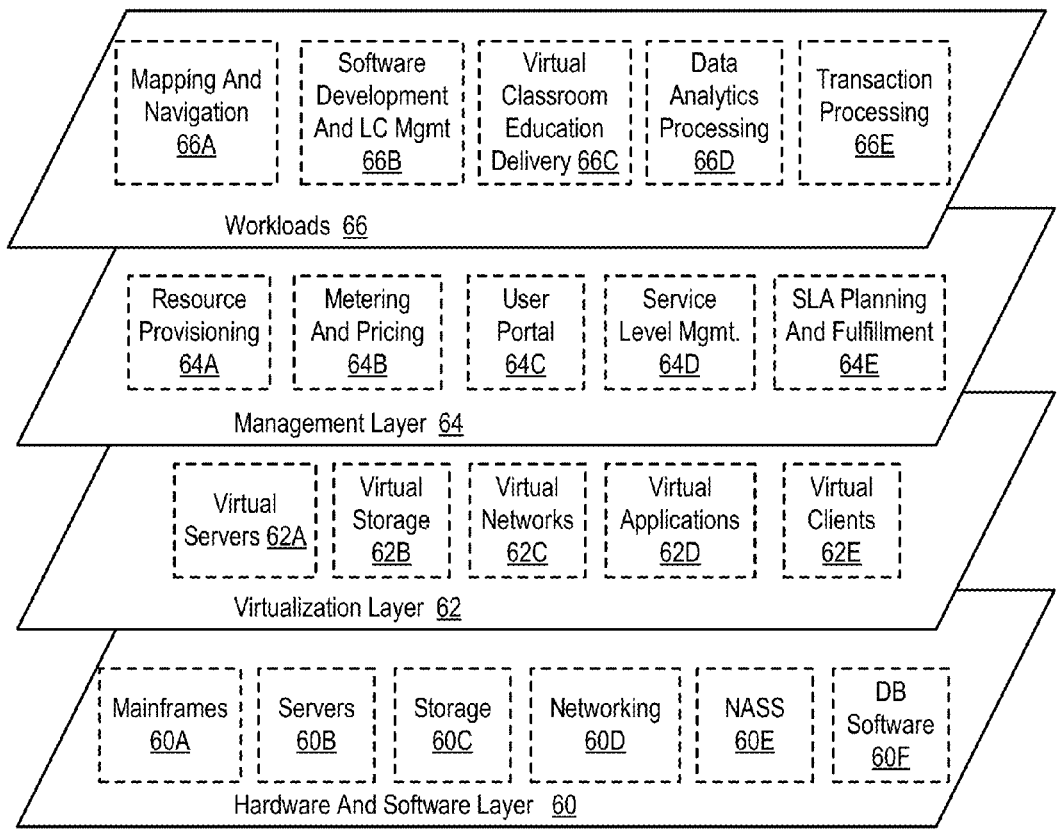
FIG. 3 depicts abstraction model layers according to an embodiment of the present invention.

Referring now to FIG. 3, a set of functional abstraction layers provided by cloud computing environment (element 50 in FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer (60) includes hardware and software components. Examples of hardware components include mainframes (60A), in one example IBM® zSeries® systems; RISC (Reduced Instruction Set Computer) architecture based servers (60B), in one example IBM pSeries® systems; IBM xSeries® systems; IBM BladeCenter® systems; storage devices (60C); networks and networking components (60D). Examples of software components include network application server software (60E), in one example IBM WebSphere® application server software; and database software (60F), in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (62) provides an abstraction layer from which the following examples of virtual entities may be provided: virtual servers (62A); virtual storage (62B); virtual networks (62C), including virtual private networks; virtual applications (62D) and operating systems; and virtual clients (62E).

In one example, management layer (64) may provide the functions described below. Resource provisioning (64A) provides dynamic procurement of computing resources and other resources that are utilized to perform tasks within the cloud computing environment. Metering and Pricing (64B) provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal (64C) provides access to the cloud computing environment for consumers and system administrators. Service level management (64D) provides cloud computing resource allocation and management such that required service levels are met. Service Level Agreement (SLA) planning and fulfillment (64E) provides pre-arrangement for, and procurement of, cloud computing resources for which a future requirement is anticipated in accordance with an SLA.

Workloads layer (66) provides examples of functionality for which the cloud computing environment may be utilized. Examples of workloads and functions which may be provided from this layer include: mapping and navigation (66A); software development and lifecycle management (66B); virtual classroom education delivery (66C); data analytics processing (66D); and transaction processing (66E).

Figure 4:
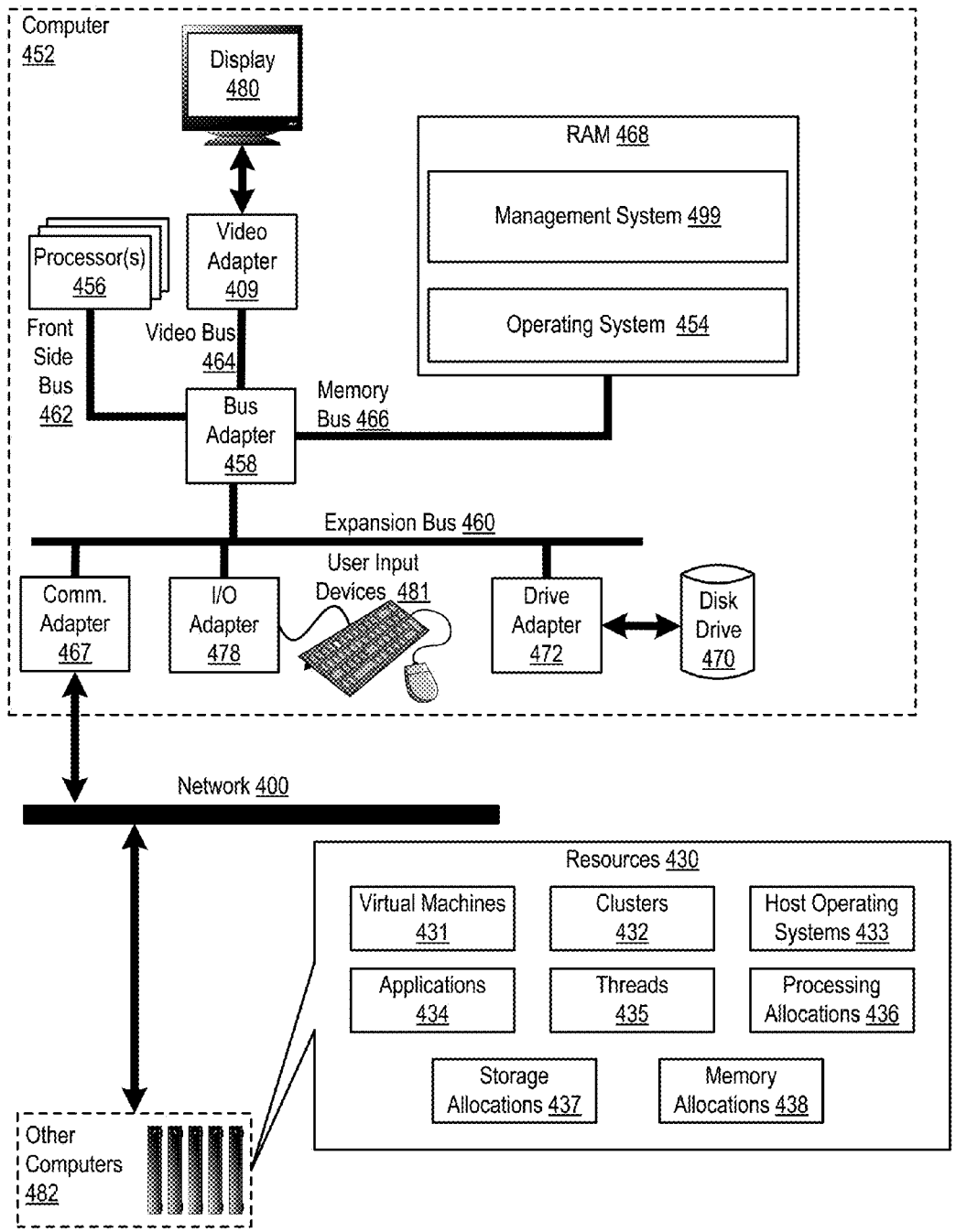
FIG. 4 sets forth a block diagram of automated computing machinery comprising an example computer useful in discovering resources in a distributed computing environment according to embodiments of the present invention.

For further explanation, FIG. 4 sets forth a block diagram of automated computing machinery comprising an example computer useful in discovering resources in a distributed computing environment according to embodiments of the present invention. The computer (452) of FIG. 4 includes at least one computer processor (456) or 'CPU' as well as random access memory (468) (RAM') which is connected through a high speed memory bus (466) and bus adapter (458) to processor (456) and to other components of the computer (452).

Stored in RAM (468) is a management system (499), a module of computer program instructions that, when executed causes the computer (452) of FIG. 4 to manage resources of a distributed computing environment. In the example of FIG. 4, a distributed computing environment (not shown) is created on components of other computers (482). The management system may also be configured to administer provisioning of virtual machines, cloud resources, memory, and the like; track customer or user usage of cloud resources; provide a systems management interface for configuration of virtual machine environments; and so on.

Examples of such resources include virtual machines (431), clusters (432) of hardware devices or virtualized hardware, host operating systems (433), applications (434), threads or processes (435), processing allocations (436), storage allocations (436), memory allocations (438), and so on as will occur to readers of skill in the art. In the example of FIG. 4, several resources (430) may be executed, instantiated, hosted, virtualized, or implemented by other computers (482) coupled via a data communications network (400) to the computer (452). Also, users (not shown here) may be coupled via one or more data communications network (400) to utilize the resources (430).

In the example of FIG. 4, the management system (499) may discovering resources of a distributed computing environment in accordance with embodiments of the present invention by transmitting an application program interface (API) message to the distributed computing environment. The management system is also configured to receive from the distributed computing environment, a response to the API message and based on the response, identify a resource of the distributed computing environment.

Also stored RAM (468) of the computer (452) is an operating system (454). Operating systems useful for discovering resources in a distributed computing environment according to embodiments of the present invention include UNIX™, Linux™, Microsoft XP™, AIX™, IBM's i5/OS™, and others as will occur to those of skill in the art. The operating systems (454) and the management system (499) in the example of FIG. 4 are shown in RAM (468), but many components of such software typically are stored in non-volatile memory also, such as, for example, on a disk drive (470).

The computer (452) of FIG. 4 includes disk drive adapter (472) coupled through expansion bus (460) and bus adapter (458) to the processors (456) and other components of the computer (452). Disk drive adapter (472) connects non-volatile data storage to the computer (452) in the form of the disk drive (470). Disk drive adapters useful in computers for discovering resources of a distributed computing environment according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (452) of FIG. 4 includes one or more input/output ('I/O') adapters (478). I/O adapters implement user-oriented input/output through, for example, software drivers and computer hardware for controlling output to display devices such as computer display screens, as well as user input from user input devices (481) such as keyboards and mice. The example computer (452) of FIG. 4 includes a video adapter (409), which is an example of an I/O adapter specially designed for graphic output to a display device (480) such as a display screen or computer monitor. The video adapter (409) is connected to the processors (456) through a high speed video bus (464), bus adapter (458), and the front side bus (462), which is also a high speed bus.

The exemplary computer (452) of FIG. 4 includes a communications adapter (467) for data communications with the other computers (482) and for data communications with the data communications network (400). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for discovering resources in a distributed computing environment according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 4 are for explanation, not for limitation. Data processing systems useful according to various embodiments of the present invention may include additional databases, servers, routers, other devices, and peer-to-peer architectures, not shown in FIG. 4, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 4.

Figure 5:
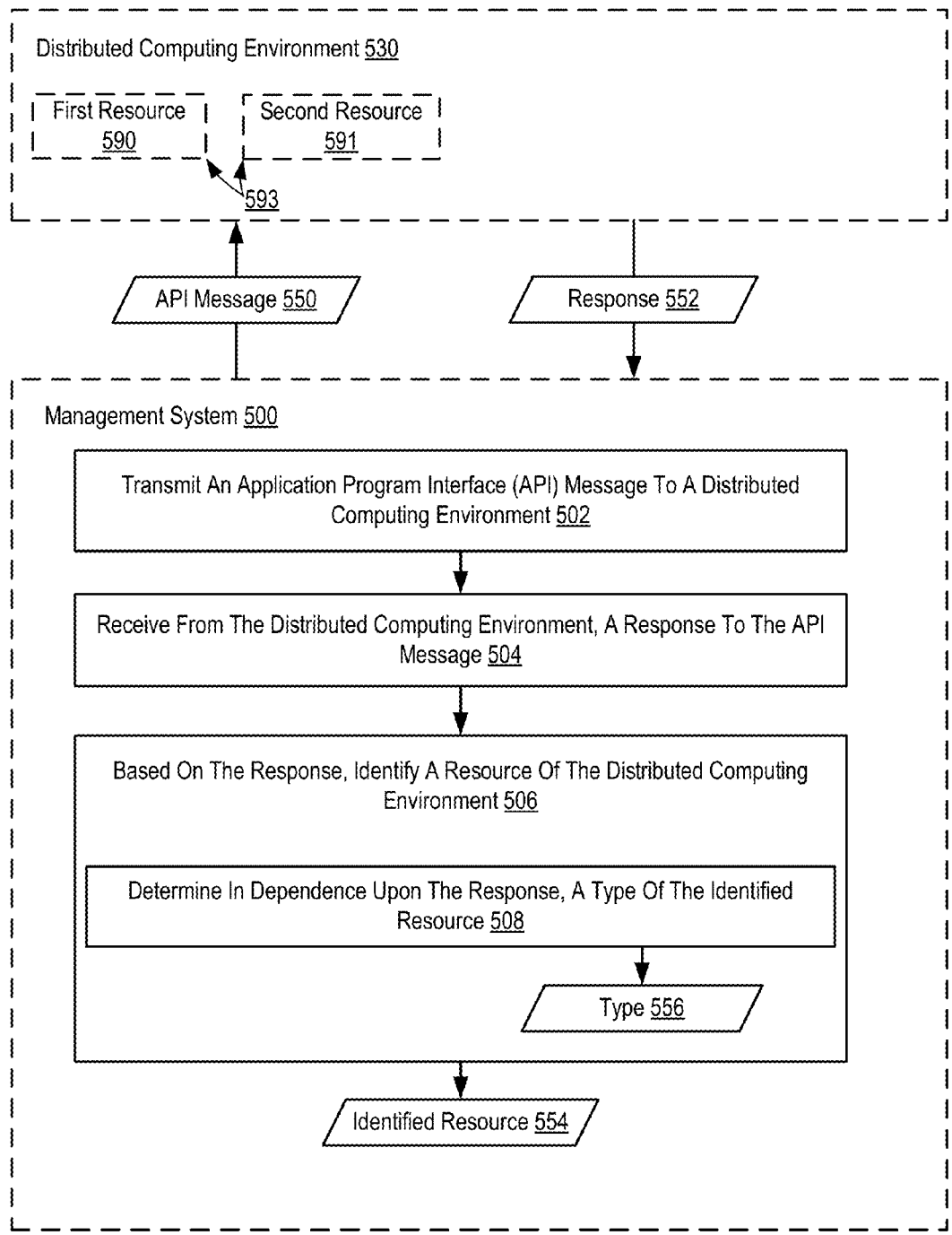
FIG. 5 sets forth a flow chart illustrating an example method for discovering resources in a distributed computing environment according to embodiments of the present invention.

For further explanation, FIG. 5 sets forth a flow chart illustrating an exemplary method for discovering resources of a distributed computing environment according to embodiments of the present invention. A distributed computing environment refers to a collection of computers, networks, and automated computing machinery configured to perform distributed processing. A non-limiting example of a distributed computing environment includes a cloud environment having a virtualized computing platform in which a user may be provided access to computing resources without knowledge, ownership, or physical access to the computer resources. The hardware, software, and capabilities of the components of a distributed computing environment or cloud environment may be offered to users as services or objects and may generally be referred to as resources. Non-limiting examples of resources include virtual machines, processing clusters, host operating systems, applications, processing threads, processing allocations, storage allocations, memory allocations, and any many others as will occur to readers of skill in the art.

In the example of FIG. 5, the distributed computing environment (530) includes a plurality (597) of resources. The method of FIG. 5 includes a management system (500) for discovering the resources (597) of the distributed computing environment (530).

The method of FIG. 5 includes the management system (500) transmitting (502) an application program interface (API) message (550) to the distributed computing environment (530). An API specifies how some software components should interact with each other. In addition to accessing databases or computer hardware, such as hard disk drives or video cards, an API can be used to ease the work of programming graphical user interface components. In practice, many times an API comes in the form of a library that includes specifications for routines, data structures, object classes, and variables. In some other cases, notably for Simple Object Access Protocol (SOAP) and Representational State Transfer (REST) services, an API comes as just a specification of remote calls exposed to the API consumers.

REST is an architectural style that abstracts the architectural elements within a distributed hypermedia system. REST ignores the details of component implementation and protocol syntax in order to focus on the roles of components, the constraints upon their interaction with other components, and their interpretation of significant data elements. REST has emerged as a predominant web API design model. The REST architectural style was developed by W3C Technical Architecture Group (TAG) in parallel with HTTP 1.1, based on the existing design of HTTP 1.0. The World Wide Web represents the largest implementation of a system conforming to the REST architectural style.

REST-style architectures conventionally consist of clients and servers. Clients initiate requests to servers; servers process requests and return appropriate responses. Requests and responses are built around the transfer of representations of resources. A resource can be any body of information, static or variable. A representation of a resource is typically a document that captures the current or intended state of a resource.

In REST, the client begins sending requests when it is ready to make the transition to a new state. While one or more requests are outstanding, the client is considered to be in transition. The representation of each application state contains links that may be used the next time the client chooses to initiate a new state-transition.

Representational State Transfer is intended to evoke an image of how a well-designed Web application behaves: presented with a network of Web pages (a virtual state-machine), the user progresses through an application by selecting links (state transitions), resulting in the next page (representing the next state of the application) being transferred to the user and rendered for their use. REST was initially described in the context of HTTP, but it is not limited to that protocol. RESTful architectures may be based on other Application Layer protocols if they already provide a uniform vocabulary for applications based on the transfer of meaningful representational state.

RESTful applications maximize the use of the existing, well-defined interface and other built-in capabilities provided by the chosen network protocol, and minimize the addition of new application-specific features on top of it. In addition to URIs; Internet media types; request and response codes; etc., HTTP has a vocabulary of operations called request methods, most notably:

| GET |
| POST |
| PUT |
| DELETE |

REST uses these operations and other existing features of the HTTP protocol. For example, layered proxy and gateway components perform additional functions on the network, such as HTTP caching and security enforcement.

As mentioned above, an important concept in REST is the existence of resources (sources of specific information), each of which is referenced with a global identifier (e.g., a URI in HTTP). In order to manipulate these resources, components of the network (user agents and origin servers) communicate via a standardized interface (e.g., HTTP) and exchange representations of these resources (the actual documents conveying the information). For example, a resource that represents a circle (as a logical object) may accept and return a representation that specifies a center point and radius, formatted in SVG, but may also accept and return a representation that specifies any three distinct points along the curve (since this also uniquely identifies a circle) as a comma-separated list.

Any number of connectors (e.g., clients, servers, caches, tunnels, etc.) can mediate the request, but each does so without "seeing past" its own request (referred to as "layering", another constraint of REST and a common principle in many other parts of information and networking architecture). Thus, an application can interact with a resource by knowing two things: the identifier of the resource and the action required—it does not need to know whether there are caches, proxies, gateways, firewalls, tunnels, or anything else between it and the server actually holding the information. The application does, however, need to understand the format of the information (representation) returned, which is typically an HTML, Extensible Markup Language (XML), or JavaScript Object Notation (JSON) document of some kind, although it may be an image, plain text, or any other content.

A RESTful web API (also called a RESTful web service) is a web API implemented using HTTP and REST principles. It is a collection of resources, with typically four defined aspects:

the base URI for the web API, such as http://example.com/resources/ the Internet media type of the data supported by the web API. This is often JSON but can be any other valid Internet media type provided that it is a valid hypertext standard.

the set of operations supported by the web API using HTTP methods (e.g., GET, PUT, POST, or DELETE).

The API is hypertext driven.

According to the example method of FIG. 5, transmitting (502) an application program interface (API) message (550) to the distributed computing environment (530) may be carried out by transmitting to the distributed computing environment, a resource identifier using a protocol command. For example, the management system (500) may transmit a URL to the distributed computing environment using a HTTP GET request. In this example, the GET request may include additional HTTP GET parameters further specifying the location of the resource.

The method of FIG. 5 also includes the management system (500) receiving (504) from the distributed computing environment (530), a response (552) to the API message (550). Receiving (504) from the distributed computing environment (530), a response (552) to the API message (550) may be carried out by receiving an HTTP reply, such as a file specifying information about the state of the resource at the location specified in the request. A response from the distributed computing environment may include files in any number of formats including: XML, a Comma Separate Values (CSV) and a JSON.

The method of FIG. 5 also includes the management system (500) identifying (506), a resource (590) of the distributed computing environment (530) based on the response (552). In a particular embodiment, the identified resource is provided by the distributed computing environment as an infrastructure as a service (IaaS). Identifying (506), a resource (590) of the distributed computing environment (530) based on the response (552) may be carried out by examining data in the response to determine if a resource is present at the address corresponding to the request.

In the example of FIG. 5, identifying (506), a resource (590) of the distributed computing environment (530) based on the response (552) optionally includes determining (508)

in dependence upon the response (552), a type (556) of the identified resource (590). Determining (508) in dependence upon the response (552), a type (556) of the identified resource (590) may be carried out by examining the data in the response to identify a type of the resource.

For example, the management system may transmit a request such as:

GET/cloud.external-api-rest/networkstorage/970 HTTP/1.1

In response to the request, the management system may receive a response that includes a file having the following information:

```
{
    "name":"NetworkStorageName",
    "description":"Network Storage Description",
    "storageGB":20
    "nodeResource":{
        "resourceURL":"/organization/5970"
    }
}
```

Continuing with this example, the management system may examine the data contained in the response to discover that a resource is at this location and that the "type" of the resource is "network storage". After identifying the resource, the management system may provide an identification of the resource and the type of the resource to another system or the user. In a particular embodiment, the management system provides the indication of the resource and an identification of the type of resource to a user within a graphical user interface. By using API requests, the management system may discover resources of a distributed computing environment and make those resources know to users.

Figure 6:
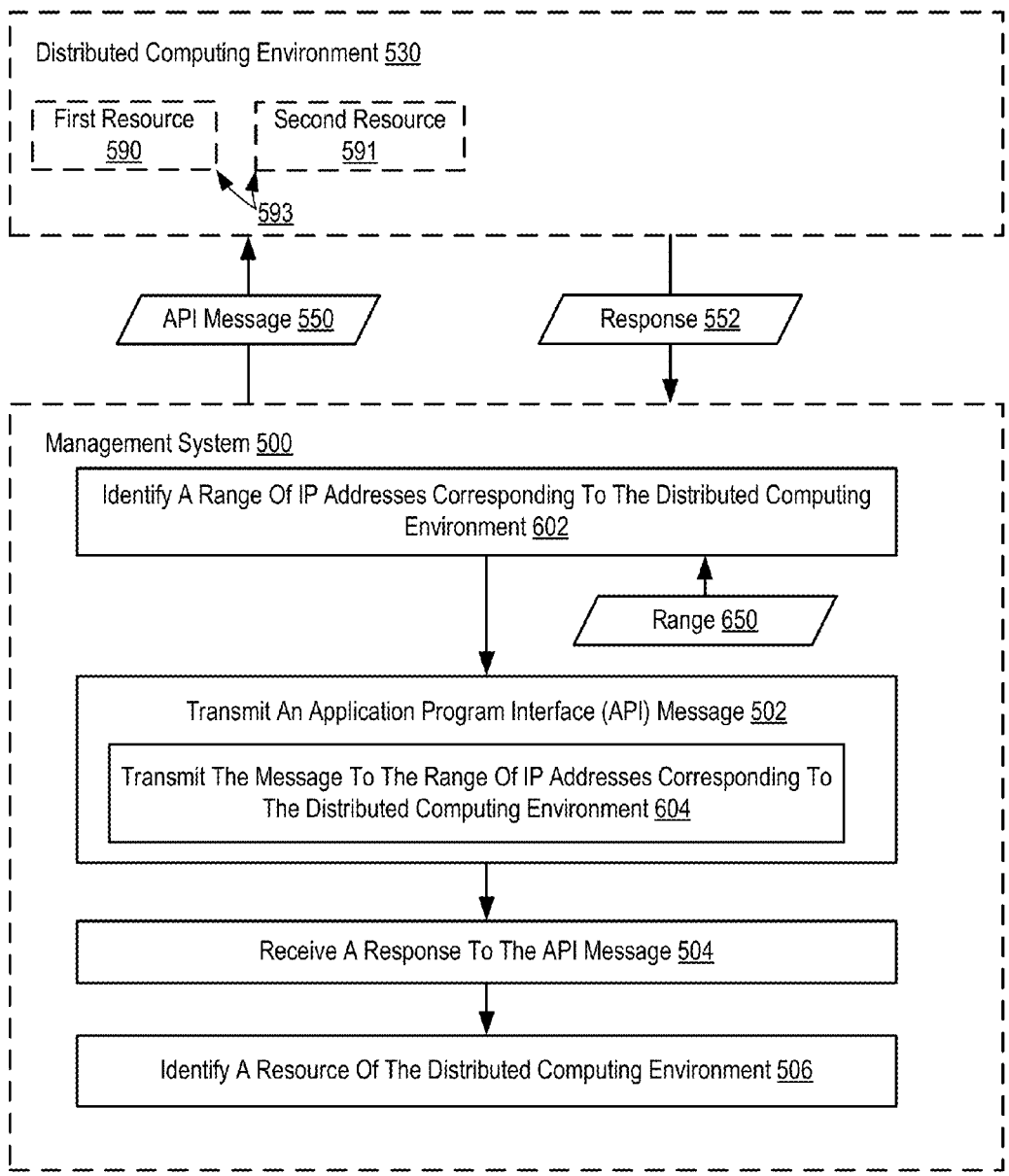
FIG. 6 sets forth a flow chart illustrating an additional example method for discovering resources in a distributed computing environment according to embodiments of the present invention.

For further explanation, FIG. 6 sets forth a flow chart illustrating another example method for discovering resources of a distributed computing environment according to embodiments of the present invention. In the method of FIG. 6 is similar to the method of FIG. 5 in that the method of FIG. 6 also includes transmitting (502) an application program interface (API) message (550) to the distributed computing environment (530); receiving (504) from the distributed computing environment (530), a response (552) to the API message (550); and based on the response (552), identifying (506), a resource (590) of the distributed computing environment (530).

The method of FIG. 6 includes the management system (500) identifying (602) a range (650) of IP addresses corresponding to the distributed computing environment (530). Identifying (602) a range (650) of IP addresses corresponding to the distributed computing environment (530) may be carried out by receiving from a user an indication of a range of IP addresses to test. For example, a user may wish to discover what resources and what types of resource are at a specific range of IP addresses.

In the method of FIG. 6, transmitting (502) an application program interface (API) message (550) to the distributed computing environment (530) includes transmitting (604) the message (550) to the range (650) of IP addresses corresponding to the distributed computing environment (530). Transmitting (604) the message (550) to the range (650) of IP addresses corresponding to the distributed computing environment (530) may be carried out by transmitting to the distributed computing environment (530), a resource identifier using a protocol command. For example, the management system (500) may transmit a URL to the distributed computing environment using a HTTP GET request.

Figure 7:
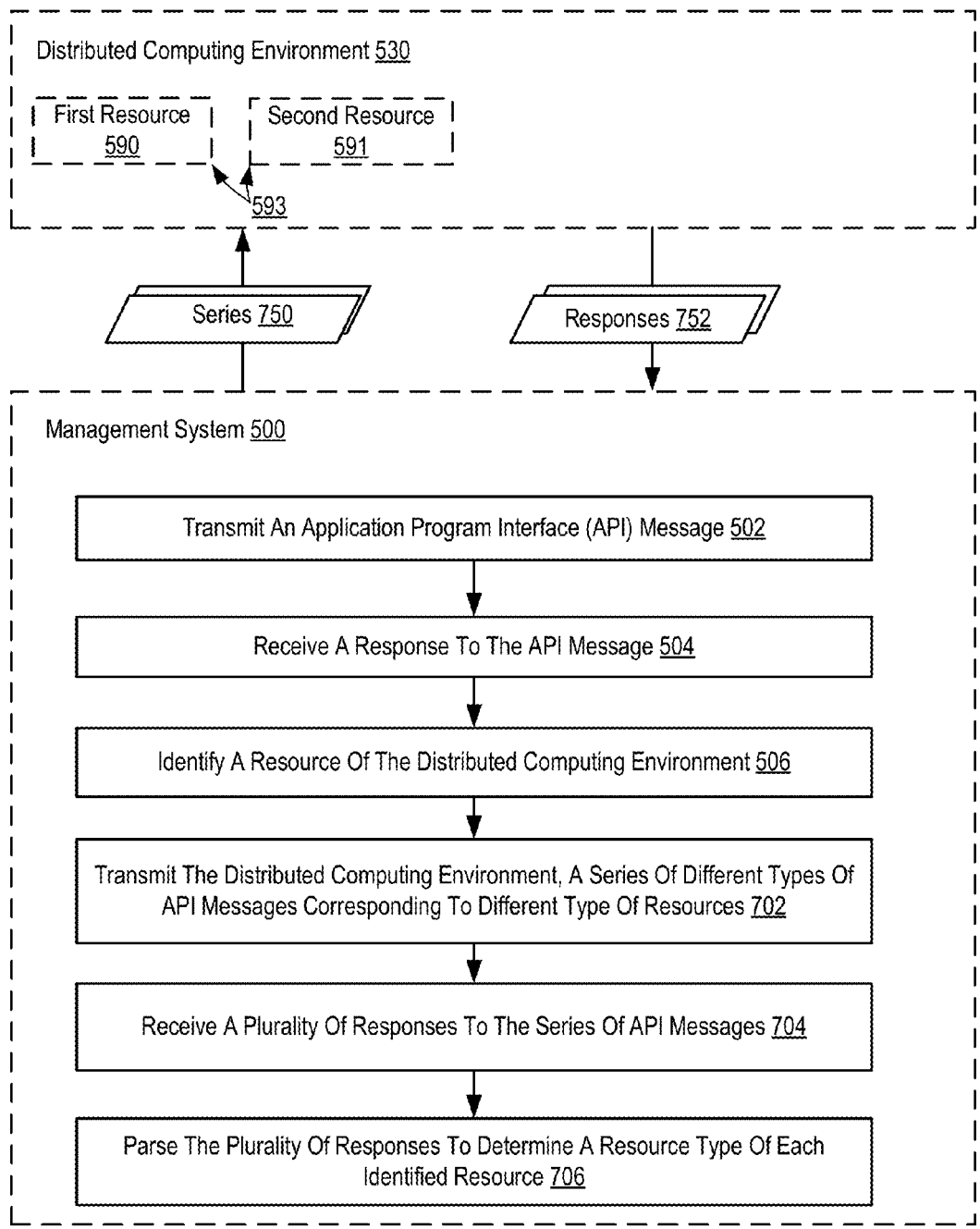
FIG. 7 sets forth a flow chart illustrating an additional example method for discovering resources in a distributed computing environment according to embodiments of the present invention.

For further explanation, FIG. 7 sets forth a flow chart illustrating another example method for discovering resources of a distributed computing environment according to embodiments of the present invention. In the method of FIG. 7 is similar to the method of FIG. 5 in that the method of FIG. 7 also includes transmitting (502) an application program interface (API) message (550) to the distributed computing environment (530); receiving (504) from the distributed computing environment (530), a response (552) to the API message (550); and based on the response (552), identifying (506), a resource (590) of the distributed computing environment (530).

The method of FIG. 7 also includes the management system (500) transmitting (702) to the distributed computing environment (530), a series (750) of different types of API messages corresponding to different types of resources. Transmitting (702) to the distributed computing environment (530), a series (750) of different types of API messages corresponding to different types of resources may be carried out by transmitting to the distributed computing environment, a series of HTTP GET requests with different parameters.

The method of FIG. 7 also includes the management system (500) receiving (704) from the distributed computing environment (530), a plurality (752) of responses to the series (750) of API messages. Receiving (704) from the distributed computing environment (530), a plurality (752) of responses to the series (750) of API messages may be carried out by receiving an HTTP reply, such as a file specifying information about the state of the resource at the location specified in the request.

The method of FIG. 7 also includes the management system (500) parsing (706) the responses (752) to determine a resource type of each identified resource. Parsing (706) the responses (752) to determine a resource type of each identified resource may be carried out by indicating a response type based on receipt of a particular response corresponding to a request associated with the response type.

For example, the management system may transmit a series of requests such as:

```
GET/cloud.external-api-rest/networkstorage/970 HTTP/1.1
GET/cloud.external-api-rest/virtualmachine/970 HTTP/1.1
```

In response to this series of requests, the management system may receive a response indicating a bad request and another response that includes a file having the following information:

```
{
    "name":"NetworkStorageName",
    "description":"Network Storage Description",
    "storageGB":20
    "nodeResource":{
        "resourceURL":"/organization/5970"
    }
}
```

Continuing with this example, the management system may determine that a virtual machine resource is not located at this location but a network storage resource is located at this location. After identifying the resource, the management system may provide an identification of the resource and the type of the resource to another system or the user. As another example, if the response is a 'not authorized response', the management system may also determine that a response is at the location. In a particular embodiment, the management system provides the indication of the resource and an identification of the type of resource to a user within a graphical user interface. By using API requests, the management system may discover resources of a distributed computing environment and make those resources know to users.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of discovering resources of a distributed computing environment, the method comprising:
   identifying, by the management system, a range of IP (Internet Protocol) addresses corresponding to the distributed computing environment;
   transmitting, by the management system to each IP address of the range of IP addresses corresponding to the distributed computing environment, a series of different types of representational state transfer (REST) application program interface (API) messages corresponding to different types of resources, wherein each of the REST API messages comprises a resource identifier;
   receiving from one or more of the IP addresses corresponding to the distributed computing environment, by the management system, one or more responses to the series of different types of REST API messages; and
   based on the responses, determining, by the management system, an identification and type of a resource of the distributed computing environment by examining the responses to identify a particular response that provides information identifying a particular resource.

2. The method of claim 1 wherein the identified resource is provided by the distributed computing environment as an infrastructure as a service (IaaS).

3. The method of claim 1 wherein the identified resource is provided by the distributed computing environment as a Platform as a Service (PaaS).

4. The method of claim 1 wherein the identified resource is provided by the distributed computing environment as a Software as a Service (SaaS).

5. The method of claim 1 wherein the identified resource is provided by the distributed computing environment as one or more virtual machines.

6. The method of claim 1 wherein the identified resource is provided by the distributed computing environment as a cluster of hardware devices.

7. The method of claim 1 wherein the identified resource is provided by the distributed computing environment as a cluster of virtual hardware devices.

8. The method of claim 1 wherein the identified resource is provided by the distributed computing environment as a processing allocations.

9. The method of claim 1 wherein the identified resource is provided by the distributed computing environment as a storage allocations.

* * * * *